United States Patent [19]

Sato et al.

[11] Patent Number: 5,057,255
[45] Date of Patent: Oct. 15, 1991

[54] MOLDING METHOD AND MOLDING APPARATUS IN AN INJECTION-COMPRESSION MOLDING MACHINE

[75] Inventors: Kan-ichi Sato; Makoto Nogawa; Satoshi Fujimoto, all of Hiratsuka; Yosuke Sasaki, Zama; Makoto Higuchi, Komatsu, all of Japan

[73] Assignee: Kabushiki Kaisha Komatsu Seisakusha, Tokyo, Japan

[21] Appl. No.: 445,623

[22] PCT Filed: Mar. 24, 1989

[86] PCT No.: PCT/JP89/00316
§ 371 Date: Jan. 5, 1990
§ 102(e) Date: Jan. 5, 1990

[87] PCT Pub. No.: WO89/09125
PCT Pub. Date: Oct. 5, 1989

[30] Foreign Application Priority Data

Mar. 24, 1988 [JP] Japan .................. 63-70078

[51] Int. Cl.⁵ .................................. B29C 45/76
[52] U.S. Cl. ........................ 264/40.5; 264/328.7; 425/145; 425/147; 425/150; 425/562
[58] Field of Search ............... 264/40.1, 40.5, 328.7, 264/328.11; 425/135, 145, 147, 150, 166, 555, 557, 562, 564, 574, 575

[56] References Cited

U.S. PATENT DOCUMENTS

| | | | |
|---|---|---|---|
| 3,787,159 | 1/1974 | Bielfeldt | 425/150 |
| 4,421,467 | 12/1983 | Richmond | 425/150 |
| 4,855,095 | 8/1989 | Sato | 425/150 |
| 4,932,854 | 6/1990 | Matsuda et al. | 264/40.5 |
| 4,952,364 | 8/1990 | Matsuda et al. | 264/40.1 |

FOREIGN PATENT DOCUMENTS

| | | |
|---|---|---|
| 21225 | 2/1985 | Japan . |
| 110419 | 6/1985 | Japan . |
| 20010 | 5/1987 | Japan . |
| 62-225318 | 10/1987 | Japan . |

Primary Examiner—Jill L. Heitbrink
Attorney, Agent, or Firm—Ronald P. Kananen

[57] ABSTRACT

A molding method in an injection-compression molding machine provided with an opening/closing valve between an injection unit and a metal mold, in which in order to make a density of molten resin uniform for resulting in production of stable molded articles, before the molten resin is injected into the metal mold, the aforementioned valve is closed to carry out preliminary pressing within the injection unit, and thereafter pressing on the molten resin is carried out within the metal mold during injection or after injection, as well as a molding apparatus for achieving the above-mentioned method. This molding apparatus includes the valve (40) disposed so as to be freely opened and closed in the flow passageway (46) of the molten resin provided between the injection unit (10) and the metal mold (30) for effecting blocking or change of a cross-section area of the above-mentioned flow passageway.

11 Claims, 10 Drawing Sheets

FIG.9C

MOLDING METHOD AND MOLDING APPARATUS IN AN INJECTION-COMPRESSION MOLDING MACHINE

TECHNICAL FIELD OF THE INVENTION

The present invention relates to an injection-compression molding machine for plastic resins, and more particularly to a molding apparatus including a valve which is disposed in a flow passageway of molten resin provided between an injection unit and a metal mold of an injection-compression molding machine to perform blocking and change of a cross-section area of the aforementioned flow passageway, as well as the molding method.

BACKGROUND TECHNIQUE OF THE INVENTION

In the prior art, for instance, as disclosed in the respective specifications and drawings of Laid-Open Japanese Patent Specifications 60-21225 (1985) and 60-110419 (1985), a molding method by means of a compression molding method is achieved through the steps of pouring resin material to be molded into a heated metal mold, actuating the molding machine to press the material at a low pressure, after the molten resin material to be molded has been filled within the metal mold, once opening upper and lower metal molds a little to remove a gaseous component in the material, again pressing the material at a high pressure, continuing the pressing and the heating until the material has finished to be hardened, and thereafter taking out a molded ariticle by opening the mold. On the other hand, in injection-compression molding, when molten resin material is injected into a metal mold, an injection flow rate and an injection flow velocity of the molten resin are controlled by a moving speed of a screw and a pressing force of the screw.

However, in the above-described compression molding method in the prior art, due to the fact that the pressing is effected as divided into low-pressure pressing and high-pressure pressing, a lot of man-hours are necessitated.

In addition, in the injection-compression molding, since molten resin is injected into a metal mold as varying a speed and a pressure of a screw, depending upon viscosity and elasticity of the molten resin, the responsibility would become an issue, and furthermore, in molding at a low flow resistance such as injection-compression molding, a time of injecting molten resin into a metal mold or an amount of molten resin to be molded cannot be stabilized, so that defects (short-sits, shrinks and warps) would arrive in the molded articles.

Moreover, in the case where compression is commenced during injection, a flow resistance of molten resin would increase gradually, hence in the injection method in the prior art, an amount of injection would vary depending upon viscosity and elasticity of the molten resin, resulting in surplus or shortage in the amount of injection, and so, there is a shortcoming that burrs or short-sits are generated.

SUMMARY OF THE INVENTION

The present invention has been worked out in view of the aforementioned circumstance, and an object of the invention is to provide a molding method which can obtain stable products within a short period of time by carrying out preliminary pressing within an injection unit before injecting molten resin into a metal mold in order to make a density of the molten resin uniform and subsequently carrying out pressing of the molten resin within the metal mold during injection or after injection in an injection-compression molding machine provided with a value between an injection unit and a metal mold, and a molding apparatus for achieving the above-mentioned molding method.

In order to achieve the aforementioned object, according to a first aspect of the present invention, there is provided a molding method in an injection-compression molding machine including a valve disposed in a flow passageway of molten resin provided bewteen an injection unit and a metal mold for effecting blocking and change of a cross-section area of the above-mentioned flow passageway, which method consists of the steps of carrying out preliminary pressing on the molten resin within the injection unit under a closed condition of the aforementioned valve in order to make a density of the molten resin uniform, thereafter injecting a preset amount of molten resin into the aforementioned metal mold by opening the above-described valve, then closing the above-mentioned valve again after completion of injection, and simulteneously pressing the molten resin within the metal mold.

According to a second aspect of the present invention, there is provided a molding method in an injection-compression molding machine, characterized in that the pressing on the molten resin within the metal mold as described in connection to the first aspect is carried out from the midst of injection of the molten resin.

According to a third aspect of the present invention, there is provided a molding apparatus in an injection-compression molding machine, characterized in that the apparatus includes valve means disposed in a flow passageway of molten resin provided between an injection unit and a metal mold for effecting blocking and change of a cross-section area of the aforementioned passageway.

According to a fourth aspect of the present invention, there is provided a molding apparatus in an injection-compression molding machine, characterized in that the valve means as described above in connection with the third aspect includes a rotary valve performing a rotary operation as actuated by a valve operating device, and a cross-section of a flow passageway of molten resin is varied by the rotary operation of the above-mentioned rotary valve so as to control at least an injection flow velocity and an injection flow rate of the molten resin.

According to a fifth aspect of the present invention, there is provided a molding apparatus in an injection-compression molding machine, characterized in that the apparatus further includes means for detecting a pressure within an injection cylinder, means for detecting a position of a screw provided within the injection cylinder, means for detecting an opening/closing speed of a metal mold, input means for setting an opening angle of a valve, input means for setting the opening/closing speed of the metal mold, input means for setting the position of the screw, means responsive to a pressure signal of the injection cylinder for generating an opening/closing signal for the valve, a valve opening/closing actuator driven by the opening/closing signal for the valve, means responsive to a position signal of the screw for generating an opening/closing speed signal for the metal mold, and a press having the metal mold mounted thereto and driven by the opening/closing speed signal for the metal mold.

The above-mentioned and other objects, aspects and advantages of the present invention will become apparent for those skilled in the art from the following description showing preferred embodiments conformed to a principle of the present invention as practical examples taken in cojunction with the accompanying drawings.

DETAILED DESCRIPTION OF THE PREFERRED EMBODIMENTS

In the following, a number of preferred embodiments of the present invention will be described in detail in connection to the accompanying drawings.

Figure 1:
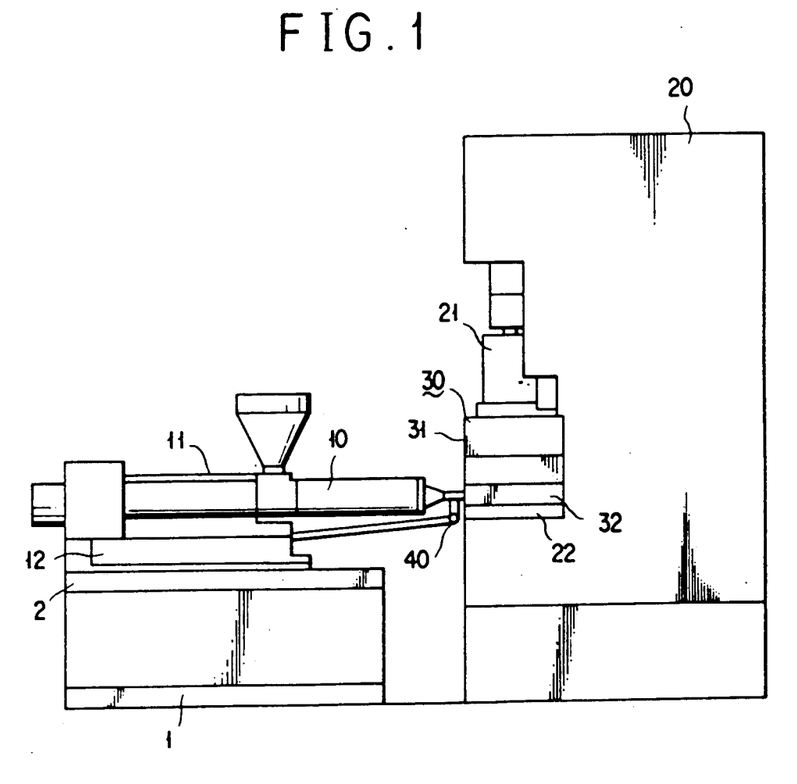
FIG. 1 is a schematic front view showing a general construction of an injection-compression molding machine provided with a molding apparatus according to the present invention.

FIG. 1 is a schematic front view showing a general construction of an injection-compression molding machine provided with a molding apparatus according to the present invention, in which reference numeral 1 designates an injection-conpression molding machine, numeral 10 designates an injection unit, numeral 20 designates a press, and numeral 30 designates a metal mold. Reference numeral 40 designates a valve, which is disposed within a flow passageway 46 (shown in FIG. 2) of molten resin (hereinafter called simply "resin") provided between the injection unit 10 and the metal mold 30, and normally it is juxtaposed on the side of the injection unit 10. The injection unit 10 is mounted so as to be slidable on a bed 2 of the injection-compression molding machine 1 by means of a slider 12 fixedly secured to an injection cylinder 11.

The metal mold 30 is composed of an upper mold 31 and a lower mold 32, the upper mold 31 and the lower mold 32 are fixedly secured to a slide 21 of the press 20 and to a bed 22 of the press 20, respectively, and resin within the metal mold 30 is pressed by a depressing force of the slide 21.

Figure 2:
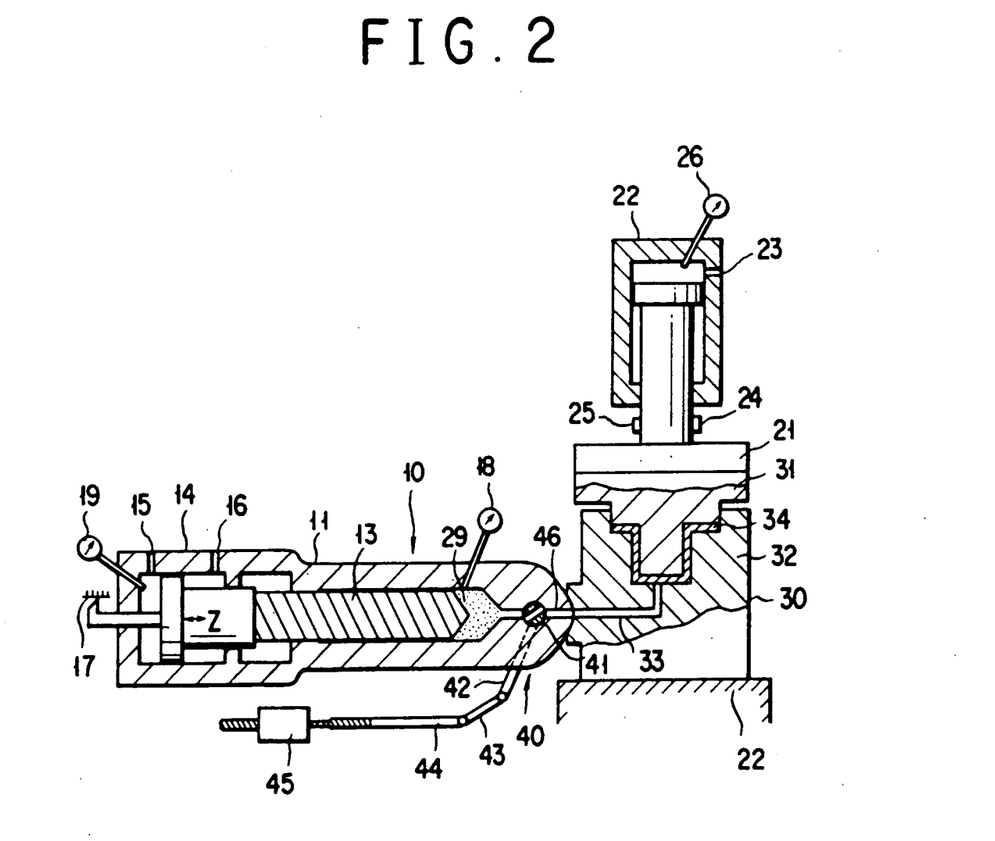
FIG. 2 is a schematic longitudinal cross-section view showing an essential part of a molding apparatus according to the present invention.

In FIG. 2, a screw 13 is tightly inserted into the injection cylinder 11 and is also connected to a cylinder 14, and it is made to slide in the Z-direction jointly with the cylinder 14 by a hydraulic pressure fed through intake and exhaust ports 15 and 16 provided in the cylinder 14. The slide movement of the screw 13 within the injection cylinder 11 is measured as a screw position by means of a potentiometer 17.

Molten resin is sealingly filled in the intension 29 of the injection cylinder 11 and is pressed by the screw 13, and the pressure of the pressed resin is detected by means of a pressure gauge 18. The cylinder 14 for pressing the screw 13 has its pressure detected by means of a pressure gauge 19.

A valve 40 is associated with the injection unit 10, it is composed of a rotary valve 41, a lever 42, rods 43 and 44 and a linear motor 45, and by controlling operations of the linear motor 45, turning of the rotary valve 41 is effected to perform blocking and changing of a cross-section area of the flow passageway 46 of resin. The valve 40 is made to butt against the metal mold 30 by slide movement of the injection unit 10 associated therewith, and the flow passageway 46 of the valve 40 is communicated with a flow passageway 33 of the metal mold 30.

The flow passageway 33 of the metal mold 30 is provided in the lower mold 32, and is extended to a product forming portion 34. The product forming portion 34 has one end opposed to the lower mold 32 and the other end opposed to the upper mold 31, and its inner volume is reduced by movement of the upper mold 31. A mutual opening/closing speed of the metal mold and a pressure of resin sealingly filled in the product forming portion 34 are determined by a moving speed and a pressing force of the upper mold 31. The moving speed and the pressing force of the upper mold 31 are controlled by a speed and a thrust of a hydraulic cylinder 22 for driving the slide 21 of the press 20 (shown in FIG. 1) having the upper mold 31 mounted thereto, and are determined by a flow rate and a hydraulic pressure in a hydraulic circuit extending from a port 23 but not shown.

The slide 21 is provided with a potentiometer 24 and a speed sensor 25, and thereby a stroke position and a speed of the slide 21 are detected. The hydraulic cylinder 22 is associated with a hydraulic pressure gauge 26 and thereby a pressing force of the slide 21 is detected.

Figure 3:
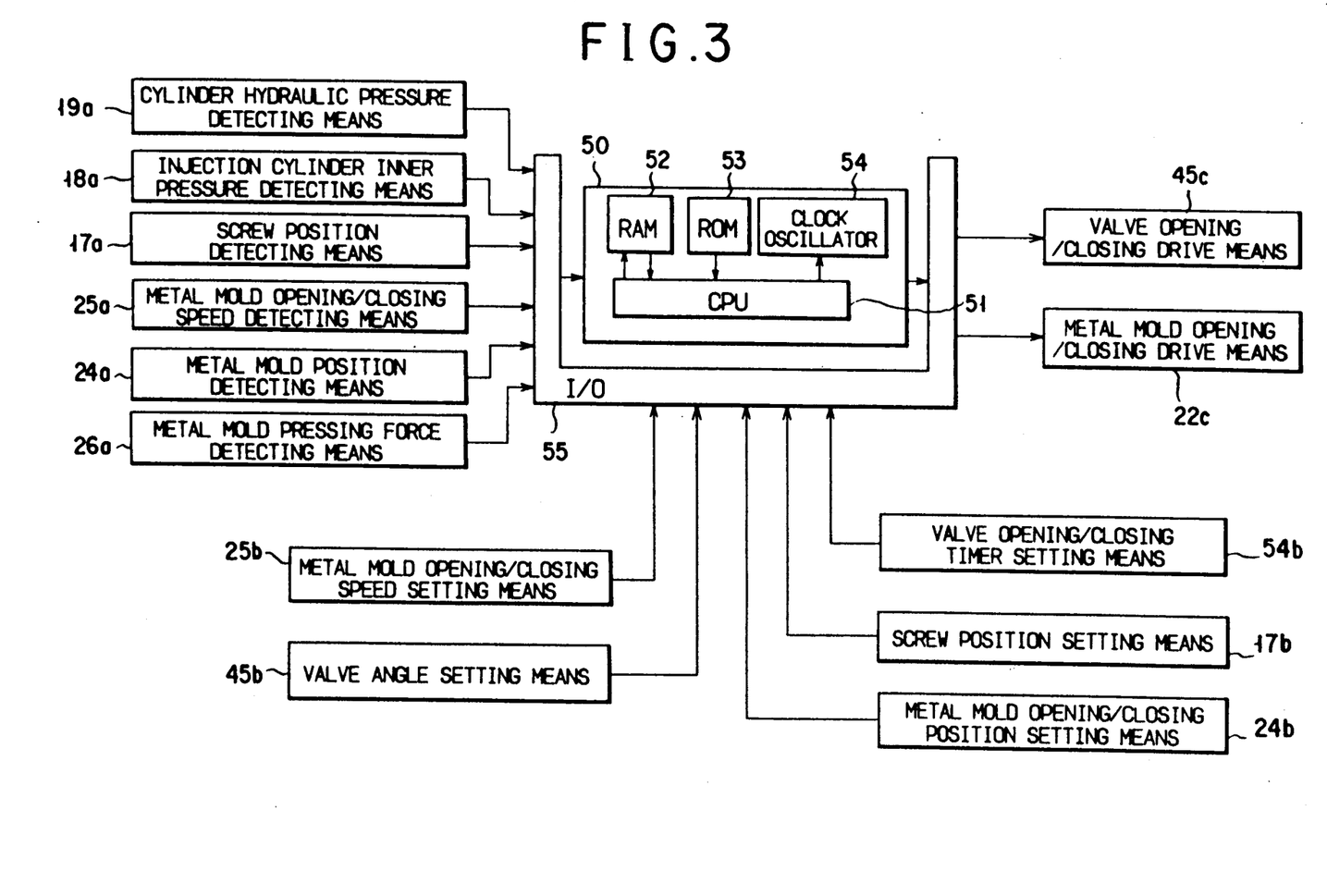
FIG. 3 is a block diagram of a control unit for a molding apparatus according to the present invention.

In FIG. 3, a controller 50 consists of a CPU 51, RAM 52, ROM 53 and a clock oscillator 54, by the intermediary of an interface 55 it is associated with detecting means such as injection cylinder inner pressure detecting means 18a consisting of the pressure gauge 18 for measuring the pressure of resin within the injection cylinder or the like, screw position detecting means 17a consisting of the potentiometer 17 for measuring the position of the screw 13 within the injection cylinder 11 or the like, cylinder hydraulic pressure detecting means 19a for measuring a hydraulic pressure in the cylinder 14 for pushing the screw 13, metal mold opening/closing speed detecting means 25a consisting of the speed sensor 25 for measuring an opening/closing speed of the metal mold or the like, metal mold position detecting means 24a consisting of the potentiometer 24 for measuring the position of the metal mold or the like, and metal mold pressing force detecting means 26a for detecting a pressing force of the metal mold, as well as setting means such as valve angle setting means 45b for setting an opening angle of the valve 40, metal mold opening/closing speed setting means 25b and metal mold opening/closing position setting means 24b for setting an opening/closing speed and the position of the metal mold 30, screw position setting means 17b for setting the position of the screw 13 which serves as a reference for control relating to opening/closing of the valve 40 and the metal mold 30, and valve opening/closing timer setting means 54b for setting opening/closing time of the valve 40, and it outputs signals for controlling valve opening/closing drive means 45c such as the linear motor 45 for controlling opening/closing of the valve 40 or the like, and metal mold opening/closing drive means 22c such as the hydraulic cylinder 22 for controlling opening/closing of the metal mold 30 or the like, on the basis of the signals detected in correspondence to the respective setting means.

In the above-described construction, description will be made on a first preferred embodiment with reference to FIGS. 3, 4A, 4B, 4C and 5. At time $t_1$ of the clock oscillator 54, operation of the screw 13 is started (Step 61). A pressure of resin within the injection cylinder 11 reaches a set pressure $P_0$ (Step 62), and when a set time has elapsed and resin has become stable (time $t_1$, Step 63), a cross-section area $A_1$ of the flow passageway 46 of resin is set, and an instruction for an opening angle $B_1$ of the valve which determines a flow velocity of resin (Step 64) and an instruction for an opening/closing speed $C_1$ of the metal mold for pressing the resin injected into the metal mold 30 (Step 65) are issued.

Figure 5:
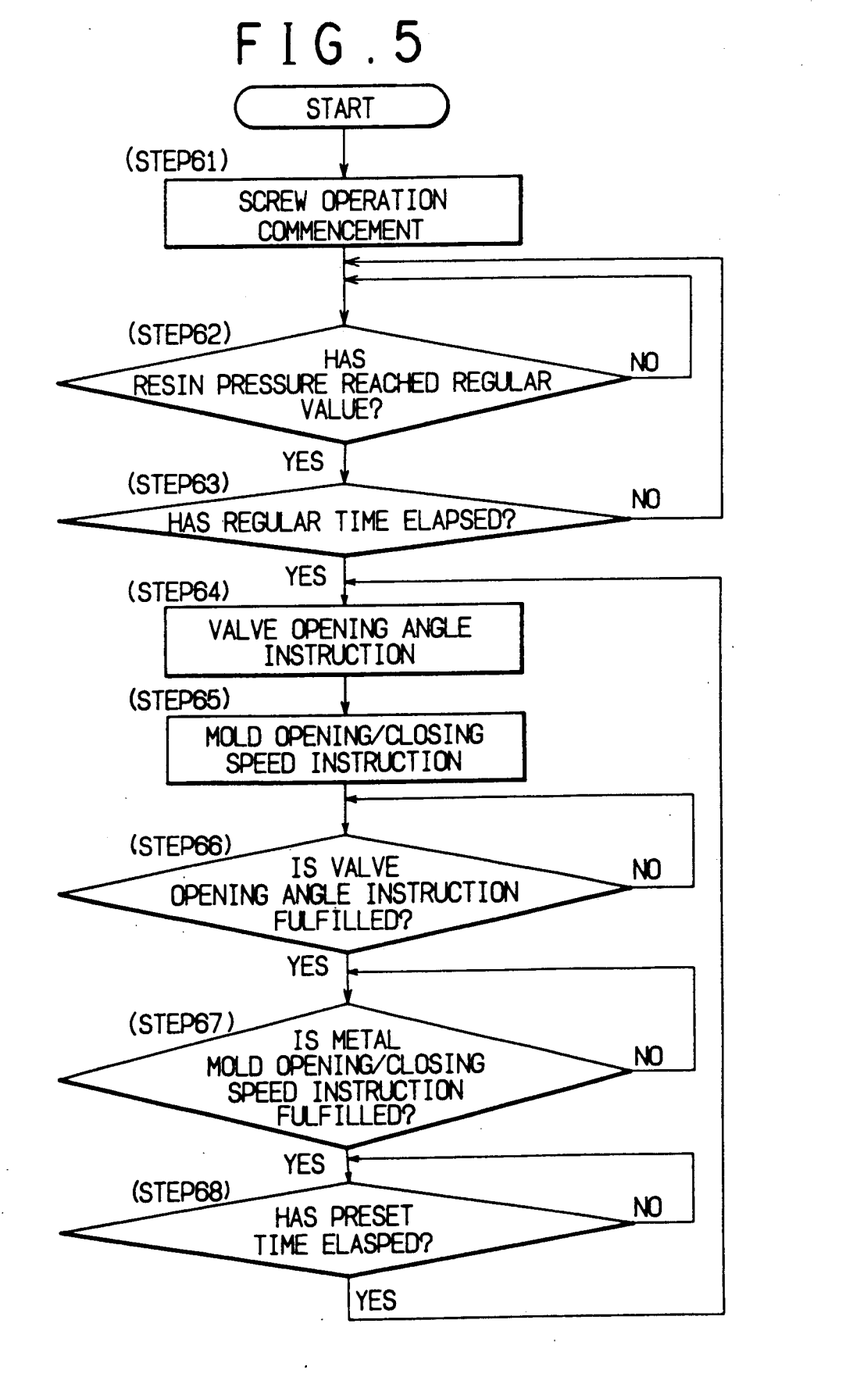
FIG. 5 is a flow chart showing the operations of the first preferred embodiment relating to the molding method according to the present invention.
Figure 6A:
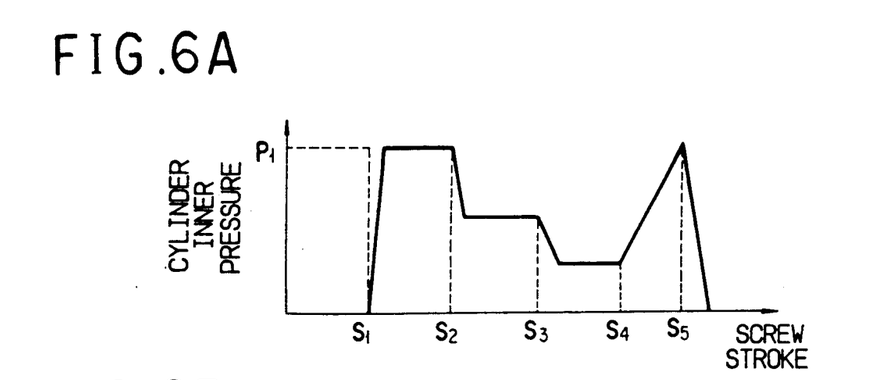
FIGS. 6A, 6B and 6C are time charts respectively showing operations of a second preferred embodiment relating to the molding method according to the present invention, with reference to a screw stroke.
Figure 6B:
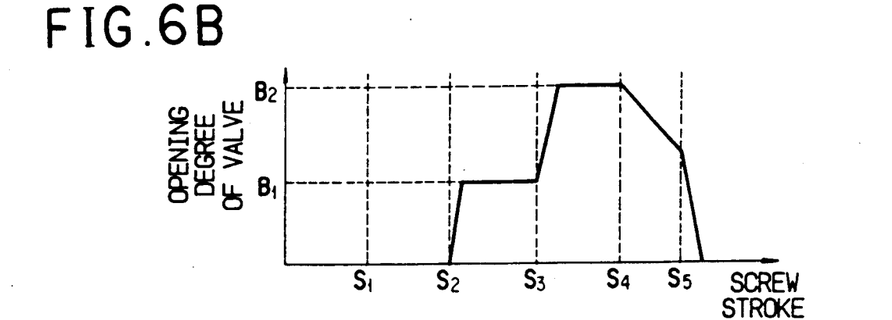
Figure 6C:
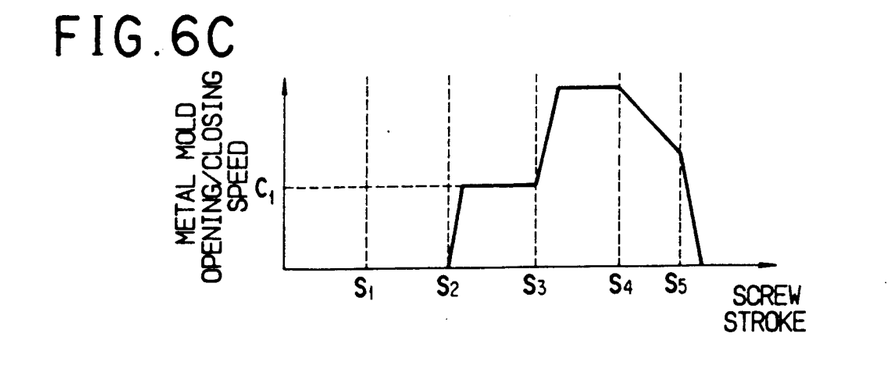

After the opening angle of the valve has become the instructed angle (Step 66), count of the clock oscillator 54 is commenced, and also in Step 67, control is effected so that the opening/closing speed of the metal mold may become a predetermined speed.

In Step 68, after a predetermined period has elapsed ($t_3$) since the valve opening angle $B_1$ became the predetermined angle in Step 67, that is, after a predetermined amount of resin has been injected, the control is returned to Step 64 and Step 65 for setting the next valve opening angle $B_2$ and metal mold opening/closing speed $C_2$.

Figure 4A:
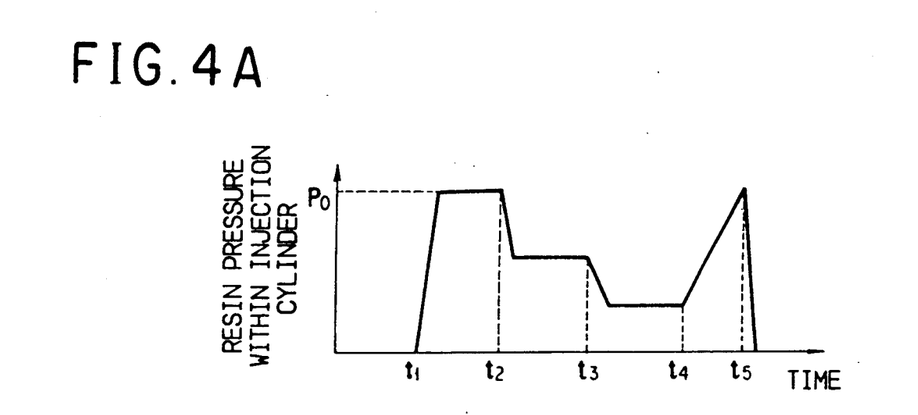
FIGS. 4A, 4B and 4C are time charts respectively showing operations of a first preferred embodiment relating to the molding method according to the present invention.
Figure 4B:
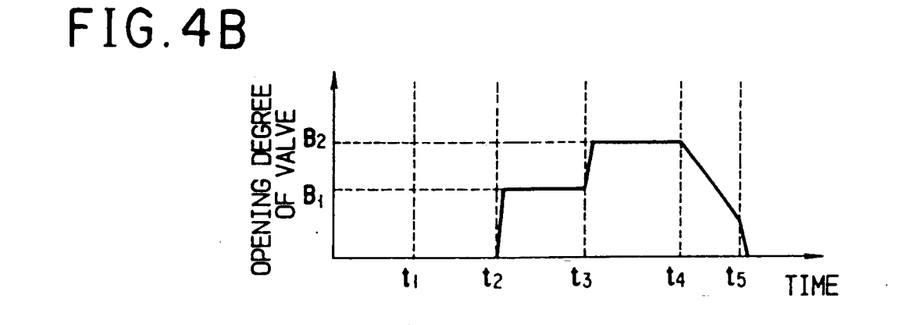
Figure 4C:
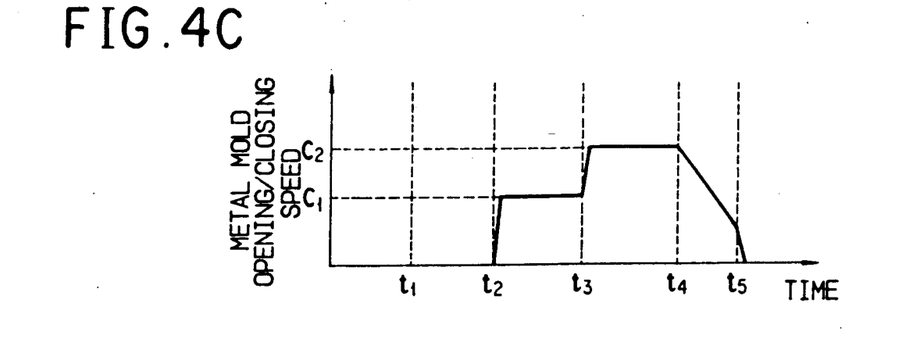

Thereafter, at time $t_4$ and $t_5$ similar switching is effected, at time $t_5$ the injection is finished, and the valve 40 is closed.

Next, description will be made on a second preferred embodiment in connection to FIGS. 6A, 6B, 6C and 7. A the position of stroke $S_1$, the screw 13 starts to operate (Step 71). The pressure in the injection cylinder 11 is brought to a set pressure $P_1$ so that the pressure of the resin in the injection cylinder may reach a set pressure $P_0$ (Step 72), and when the screw has become stable stroke $S_2$ (Step 73), a cross-section area $A_1$ of the flow passageway 46 of resin is set and an instruction for a valve opening angle $B_1$ to determine a flow velocity of resin is issued (Step 74), and when the valve opening angle $B_1$ has reached the instructed value (Step 75), an instruction for a metal mold opening/closing speed $C_1$ to press the resin injected into the metal mold 30 is issued (Step 76). In Step 77, control is effected so that the metal mold opening/closing speed may become a predetermined speed.

Figure 7:
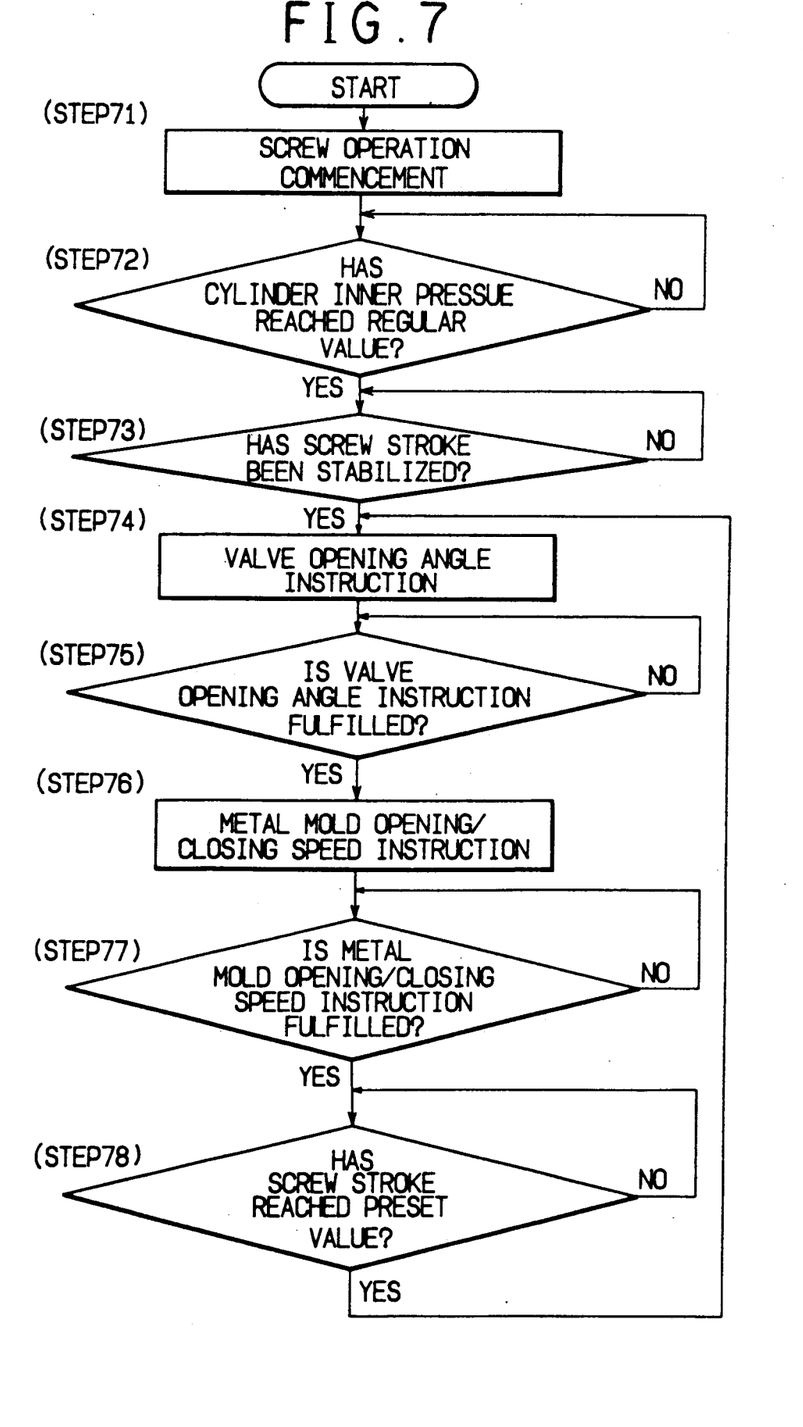
FIG. 7 is a flow chart showing operations of a second preferred embodiment relating to the molding method according to the present invention.

Injection by means of the screw 13 proceeds, and when its stroke has come to a predetermined position $S_3$ (Step 78), that is, when a predetermined amount of resin has been injected, the control returns to Step 74, and an instruction for a valve opening angle $B_2$ to determine the next flow velocity of resin, is issued.

Thereafter, Steps 74–78 are repeated, at stroke $S_5$ the injection is finished and the valve is closed.

Figure 8:
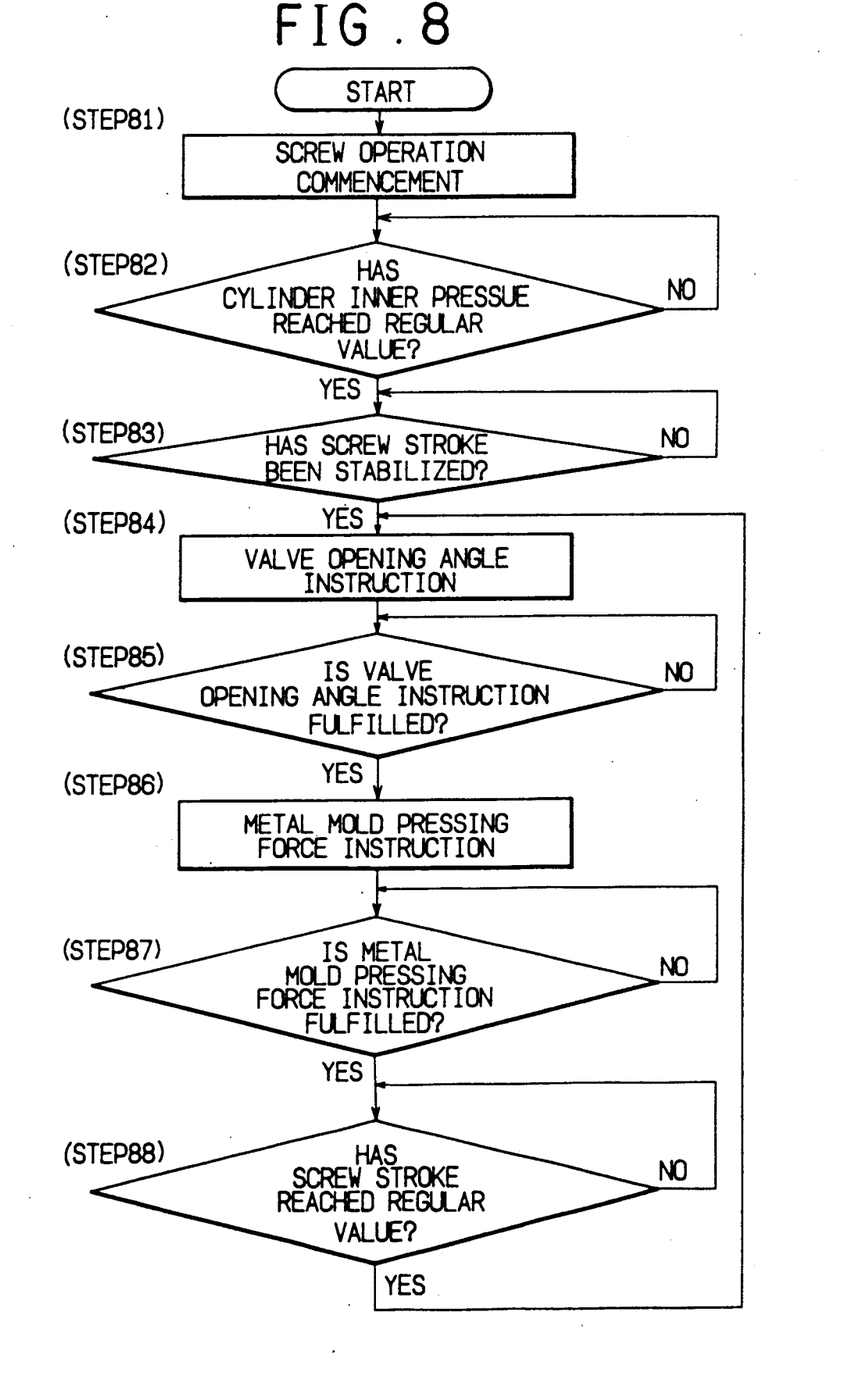
FIG. 8 is a flow chart showing operations of a third preferred embodiment relating to the molding method according to the present invention.

Next, a third preferred embodiment will be described in connection to FIG. 8.

In this third preferred embodiment, as compared to the above-described second preferred embodiment, during control for the metal mold while the metal mold closing speed was controlled according to the stroke of the screw 13 in the second preferred embodiment, in the third preferred embodiment this is modified so as to control a pressing force for the upper mold 31 of the metal mold 30.

Figure 9A:
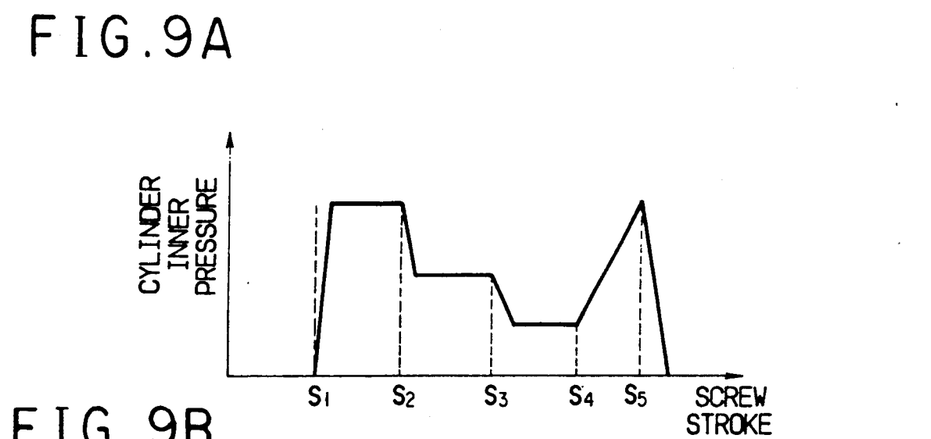
FIGS. 9A, 9B and 9C are time charts respectively showing operations of a fourth preferred embodiment relating to the molding method according to the present invention, with reference to a screw stroke.
Figure 9B:
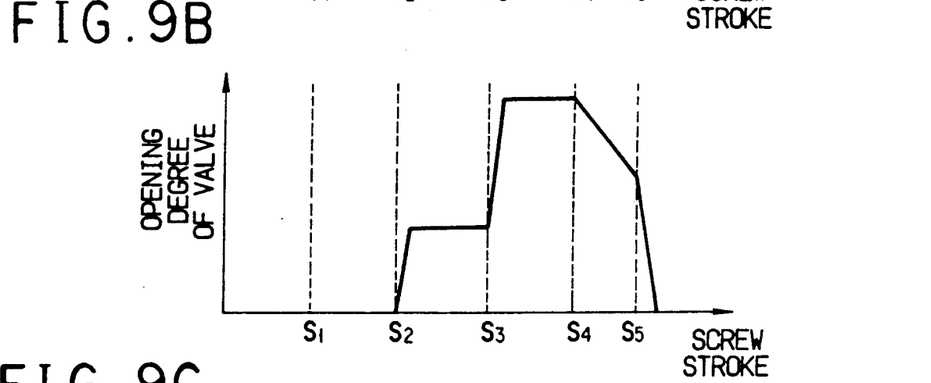
Figure 9C:
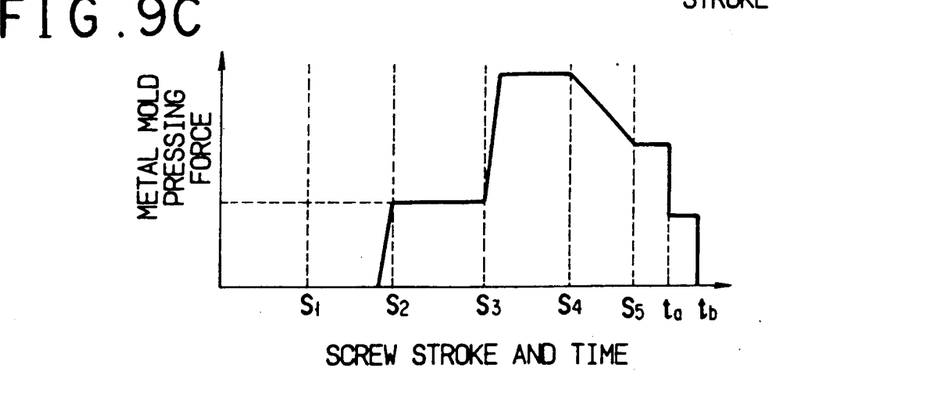
Figure 10:
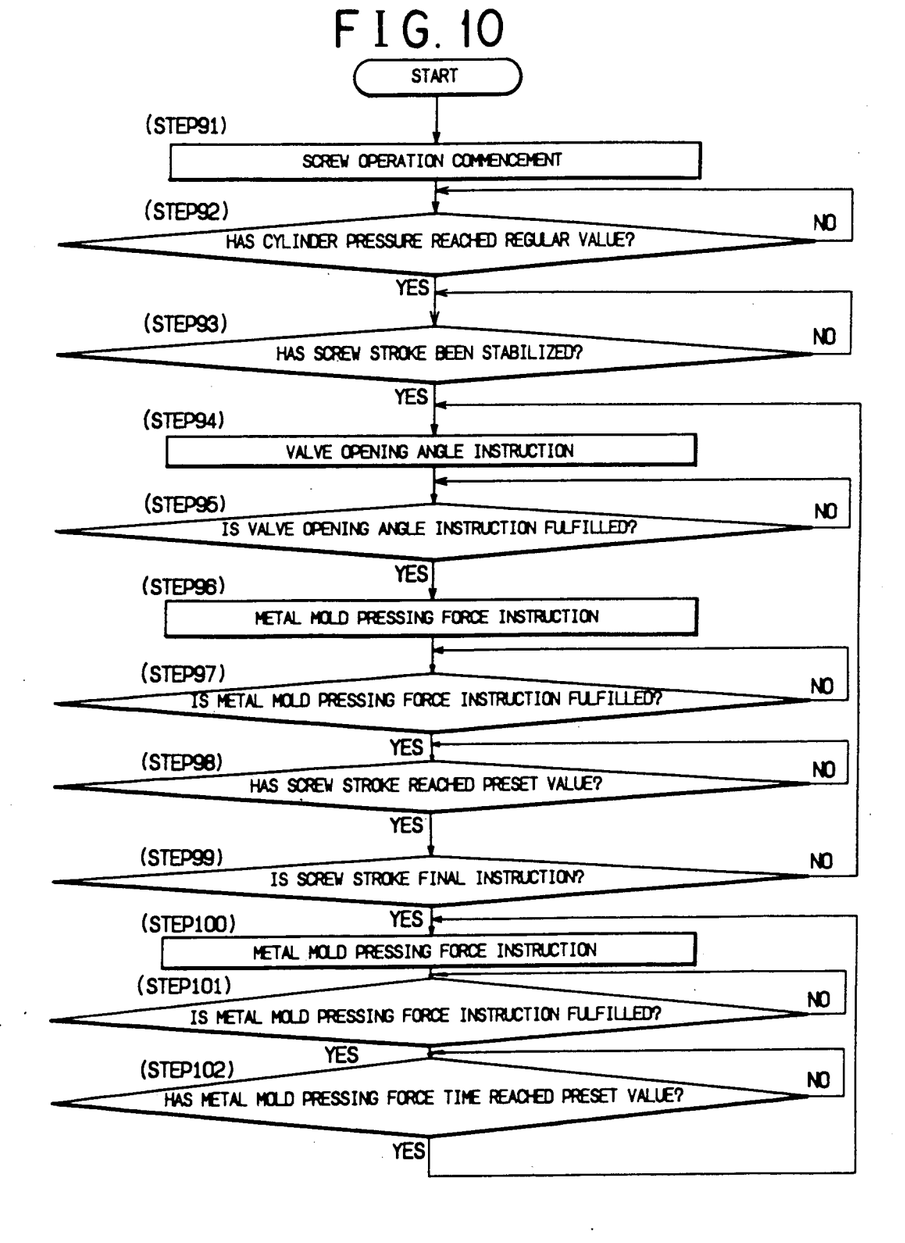
FIG. 10 is a flow chart showing the operations of the fourth preferred embodiment relating to the molding method according to the present invention.

In succession, description will be made on a fourth preferred embodiment in connection to FIGS. 9 and 10. Up to Step 88 of the above-described third preferred embodiment and Step 98 of this fourth preferred embodiment, the control is the same, but in the fourth preferred embodiment, when the screw stroke has reached the final instruction, the valve 40 is held closed. After the valve 40 has been closed, the pressing force for the metal mold is varied in a step-wise manner or continuously taking into consideration the shrinkage of resin caused by cooling and the like.

It is to be noted that while a screw was used in the injection unit in the above-described respective embodiments, a plunger could be used therein. Also, while the valve was controlled by making use of a rotary valve and a linear motor, it is a matter of choice that a combination of a valve such as a needle valve, a slide valve or the like and either angular control such as a step motor or the like or linear control such as a linear motor or the like, could be employed.

In addition, while a stroke of a screw was used as a reference of control, time or a pressure in an injection unit could be used.

Furthermore, regarding a press, while a hydraulic press was employed, a mechanical press could be employed, and the first preferred embodiment, the second preferred embodiment and the third preferred embodiment could be employed in combination.

We claim:

1. A method of molding a plastic resin comprising the steps of:
   pressurizing a resin within an injection unit for a set period of time $T_1$;
   determining that said resin has reached a set pressurizing value $P_0$;
   sending an instruction for an opening angle $B_1$ of a valve means disposed between a mold cavity formed in a metal mold and said injection unit along a resin flow passage communicating said injection unit with said mold cavity and sending an instruction for an opening/closing speed $C_1$ of the metal mold for pressing the resin injected into the mold cavity when a set period of time $T_2$ has elapsed and when said resin has reached said set pressurizing value $P_0$;
   determining that said opening angle $B_1$ of said valve means has become the instructed angle;
   determining that a said opening/closing speed $C_1$ of said metal mold has become the instructed opening/closing speed; and
   determining that a set period of time $T_3$ has elapsed.

2. The method of molding a plastic resin according to claim 1, further comprising the steps of:

sending an instruction for an opening angle $B_2$ of said valve means and sending an instruction for an opening/closing speed $C_2$ when said set period of time $T_3$ has elapsed and when a predetermined amount of the resin has been injected;

determining that said opening angle $B_2$ of said valve means has become the instructed angle;

determining that said opening/closing speed $C_2$ of said metal mold has become the instructed opening/closing speed;

maintaining said opening angle $B_2$ of said valve means and said opening/closing speed $C_2$ for a set period of time $T_4$; and closing the valve means to finish the injection when a set period of time $T_5$ has elapsed.

3. The method of molding a plastic resin according to claim 1, further comprising the steps of:

starting the operation of a screw contained in an injection cylinder in said injection unit at a position of stroke $S_1$ to pressurize the resin within the injection cylinder for the set period of time $T_1$;

bringing the pressure in the injection cylinder to a set pressure $P_1$ so that the pressure of the resin in the injection cylinder may reach said set pressure $P_0$;

sending an instruction for a cross-section area $A_1$ of the resin flow passage when the screw has become a stable stroke $S_2$ and sending the instruction for the valve opening angle $B_1$;

sending an instruction for said opening/closing speed $C_1$ when the valve opening angle $B_1$ has been reached; and determining that said instruction for said opening/closing speed $C_1$ has been fulfilled and that said screw stroke has reached said preset value $S_2$.

4. The method of molding a plastic resin according to claim 3, further comprising the steps of:

proceeding with the movement of the screw to a predetermined position for injecting a predetermined amount of resin; and closing said valve means when the screw reaches a stroke position $S_5$.

5. The method of molding a plastic resin according to claim 1, further comprising the steps of:

starting the operation of a screw contained in an injection cylinder in said injection unit at a position of stroke $S_1$ to pressurize the resin within the injection cylinder for the set period of time $T_1$;

bringing the pressure in the injection cylinder to a set pressure $P_1$ so that the pressure of the resin in the injection cylinder may reach said set pressure $P_0$;

sending an instruction for a cross-section area $A_1$ of the resin flow passage when the screw has become a stable stroke $S_2$ and sending the instruction for the valve opening angle $B_1$;

sending an instruction for a metal mold pressing force of a compression unit when the valve opening angle $B_1$ has been reached; and determining that said instruction for said metal mold pressing force has been fulfilled and if said screw stroke has reached said preset value $S_2$.

6. The method of molding a plastic resin according to claim 5, further comprising the steps of:

closing said resin flow passage when said screw stroke has reached said preset value $S_2$; and varying said metal mold pressing force while taking into consideration the shrinkage of the resin caused by cooling and the like.

7. An injection-compression molding machine comprising:

a compression unit for clamping a separable mold having a mold cavity formed therein;

an injection unit for injecting under pressure a molten resin into the mold cavity;

means for detecting the stroke of said compression unit;

means for detecting the injecting position of said injection unit;

input means for setting the stroke of said compression unit;

input means for setting the injecting position of said injection unit;

stroke signal generator means for converting said detected stroke of the compression unit into a stroke signal corresponding to a value preset by said stroke setting input means;

means for generating an injecting position signal for said injection unit in response to said stroke signal;

injection unit driving means for driving said injection unit adapted to be actuated in response to the injecting position signal;

valve means disposed between said mold cavity and said injection unit along a resin flow passage communicating said injection unit with said mold cavity for controlling blocking and changing of a cross-section area of said resin flow passage; and controller means for controlling the injecting position and pressure of the molten resin in said injection unit and the moving speed and pressing force of said compression unit so that the molten resin can be preliminarily pressed within the injection unit and injected into said mold cavity as a result of actuation of said injection unit driving means and said valve means to make the density of the molten resin uniform and carrying out the pressing of the molten resin within the mold cavity by varying the injecting position, moving speed and pressing force of said compression unit in compliance with the filling speed of the molten resin within the mold cavity so that the molten resin spreads uniformly therein as it is compressed in the mold by said compression unit to result in stable products within a short period of time.

8. The injection-compression molding machine according to claim 7, wherein said injection unit includes an injection cylinder with a screw therein, said screw slidable along a central axis of said injection cylinder.

9. The injection-compression molding machine according to claim 8, further comprising means for detecting the pressure of said molten resin within said injection cylinder and means for detecting the position of said screw within said injection cylinder.

10. The injection-compression molding machine according to claim 7, wherein said valve means includes a rotary valve performing a rotary operation as actuated by a valve operating device to vary the flow of resin through said resin flow passage by the rotary operation of said rotary valve so as to control at least an injection flow velocity and an injection flow rate of the molten resin.

11. The injection-compression molding machine according to claim 10, further comprising input means for setting an opening angle of said valve means and valve opening/closing actuator means driven by the opening/closing signal for the valve means.

* * * * *